United States Patent
Colrain et al.

(10) Patent No.: US 7,444,335 B1
(45) Date of Patent: Oct. 28, 2008

(54) SYSTEM AND METHOD FOR PROVIDING COOPERATIVE RESOURCE GROUPS FOR HIGH AVAILABILITY APPLICATIONS

(75) Inventors: Carol L. Colrain, Redwood Shores, CA (US); Harvey A. Eneman, Belmont, CA (US)

(73) Assignee: Oracle International Corporation, Redwood Shores, CA (US)

(*) Notice: Subject to any disclaimer, the term of this patent is extended or adjusted under 35 U.S.C. 154(b) by 310 days.

(21) Appl. No.: 10/086,782

(22) Filed: Feb. 28, 2002

Related U.S. Application Data

(60) Provisional application No. 60/272,386, filed on Feb. 28, 2001.

(51) Int. Cl.
*G06F 17/30* (2006.01)

(52) U.S. Cl. .................. 707/10; 707/200; 709/239; 709/220; 714/4

(58) Field of Classification Search .......... 707/1–5, 707/8–10, 100–104.1, 200–203; 345/961, 345/965; 709/200–204, 267–274, 217–229; 712/1–28; 713/1; 718/100–104; 719/313; 714/1–4, 15, 18
See application file for complete search history.

(56) References Cited

U.S. PATENT DOCUMENTS

| | | | |
|---|---|---|---|
| 5,202,971 A | 4/1993 | Henson et al. | |
| 5,305,448 A | 4/1994 | Insalaco et al. | |
| 5,459,862 A | 10/1995 | Garliepp et al. | |
| 5,623,666 A | 4/1997 | Pike et al. ................ 707/200 |
| 5,659,781 A * | 8/1997 | Larson ..................... 712/11 |
| 5,692,178 A | 11/1997 | Shaughnessy | |
| 5,706,516 A | 1/1998 | Change et al. | |
| 5,727,206 A | 3/1998 | Fish et al. ................ 707/202 |
| 5,802,523 A | 9/1998 | Jasuja et al. | |
| 5,822,531 A * | 10/1998 | Gorczyca et al. ............ 709/221 |
| 5,828,876 A | 10/1998 | Fish et al. .................. 707/1 |
| 5,872,981 A | 2/1999 | Waddington et al. ........ 710/200 |
| 5,890,153 A | 3/1999 | Fukuda et al. ............... 707/8 |
| 5,920,872 A | 7/1999 | Grewell et al. | |
| 6,105,026 A | 8/2000 | Kruglikov et al. | |

(Continued)

OTHER PUBLICATIONS

"Sun Cluster 2.2 Software Installation Guide"; Sun Microsystems, Part No. 806-5342, Jul. 2000, Revision A.*

(Continued)

*Primary Examiner*—Debbie M Le
(74) *Attorney, Agent, or Firm*—Hickman Palermo Troung & Becker LLP

(57) ABSTRACT

A system and method for providing cooperative resource groups for high availability applications, such as cluster databases, is described. A cluster framework, including a plurality of nodes, is built. A plurality of cooperative resource groups is formed, each including a logical network address, at least one monitor and an application providing services and externally accessed using the logical network address. A plurality of resources is structured, each including a cluster service supporting the services provided by each application. A preferred node for execution is designated for each cooperative resource group and one or more possible nodes are provided as standby nodes for each other cooperative resource group. The services are restarted on a surviving node off a critical path of the preferred node upon an unavailability of the preferred node, while the logical network address is kept available on each possible node for the cooperative resource group.

16 Claims, 7 Drawing Sheets

U.S. PATENT DOCUMENTS

| | | | | |
|---|---|---|---|---|
| 6,108,654 | A | 8/2000 | Chan et al. | 707/8 |
| 6,148,299 | A | 11/2000 | Yoshimoto | |
| 6,185,601 | B1 * | 2/2001 | Wolff | 709/203 |
| 6,314,563 | B1 | 11/2001 | Agesen et al. | |
| 6,347,374 | B1 | 2/2002 | Drake et al. | |
| 6,370,529 | B1 | 4/2002 | Kruglikov et al. | |
| 6,401,120 | B1 * | 6/2002 | Gamache et al. | 709/226 |
| 6,405,252 | B1 * | 6/2002 | Gupta et al. | 709/224 |
| 6,418,542 | B1 | 7/2002 | Yeager | |
| 6,430,698 | B1 * | 8/2002 | Khalil et al. | 714/4 |
| 6,463,457 | B1 * | 10/2002 | Armentrout et al. | 709/201 |
| 6,560,216 | B1 * | 5/2003 | McNiff et al. | 370/349 |
| 6,625,602 | B1 | 9/2003 | Meredith et al. | 707/8 |
| 6,708,195 | B1 | 3/2004 | Borman et al. | |
| 6,738,362 | B1 * | 5/2004 | Xu et al. | 370/329 |
| 6,772,255 | B2 | 8/2004 | Daynes | 710/200 |
| 6,799,173 | B2 | 9/2004 | Czajkowski et al. | |
| 6,804,711 | B1 * | 10/2004 | Dugan et al. | 709/223 |
| 6,807,540 | B2 | 10/2004 | Huras et al. | |
| 6,892,205 | B1 | 5/2005 | Colrain et al. | |
| 2005/0171945 | A1 | 8/2005 | Colrain et al. | |

OTHER PUBLICATIONS

"Compact ProLiant Clusters HA/F100 and HA/F200 Administrator Guide", Compaq Computer Corporation, Part No. 380362-002, Second Rdition (Sep. 1999).*

Gray J et al., "Transaction Processing: Concepts and Techniques," 1993, pp. 128-138, Morgan Kaufman, San Francisco, CA.

U.S. Appl. No. 10/087,494, filed Feb. 28, 2005, Office Action Mailing Date Sep. 23, 2005.

Mahapatra, T. et al., "Oracle Parallel Processing" Aug. 2000, O'Reilly, pp. 1-7.

* cited by examiner

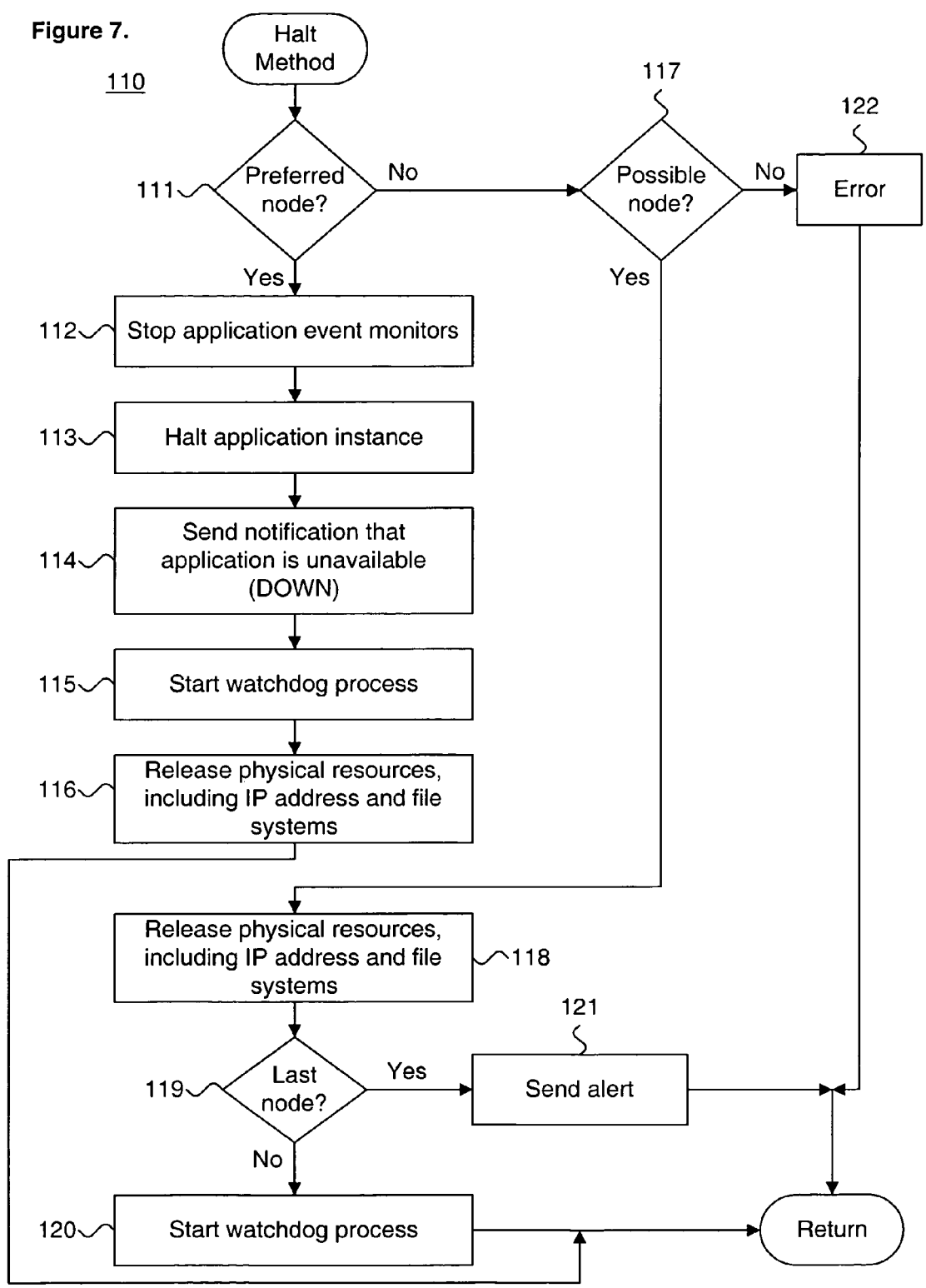

SYSTEM AND METHOD FOR PROVIDING COOPERATIVE RESOURCE GROUPS FOR HIGH AVAILABILITY APPLICATIONS

CROSS-REFERENCE TO RELATED APPLICATION

This patent application claims priority under 35 U.S.C. § 119(e) to provisional patent application Ser. No. 60/272,386, filed Feb. 28, 2001, the disclosure of which is incorporated by reference.

FIELD OF THE INVENTION

The present invention relates in general to systems and methods with high availability operating requirements and, in particular, to a system and method for providing cooperative resource groups for high availability applications, including cluster databases.

BACKGROUND OF THE INVENTION

Cluster databases provide location transparency to data by allowing multiple systems to serve the same database. One specific type of cluster database is the Oracle Real Application Clusters product, licensed by Oracle Corporation, Redwood Shores, Calif. Sets of two or more computers are grouped into real application clusters. The clusters harness the processing power of multiple interconnected computers to provide a single robust computing environment. Within each cluster, all nodes concurrently execute transactions against the same database to synergistically extend the processing power beyond the limits of an individual component. Upon the mounting of the shared database, the real application cluster processes a stream of concurrent transactions using multiple processors on different nodes. For scale-up, each processor processes many transactions. For speed up, one transaction can be executed spanning multiple nodes.

Cluster databases provide several advantages over databases that use only single nodes. For example, cluster databases take advantage of information sharing by many nodes to enhance performance and database availability. In addition, applications can be sped up by executing across multiple nodes and can be scaled-up by adding more transactions to additional nodes. Multiple nodes also make cluster databases highly available through a redundancy of nodes executing separate database instances. Thus, if a node or database instance fails, the database instance is automatically recovered by the other instances, which combine to serve the cluster database.

Cluster databases can be made more highly available through integration with high availability frameworks for each cluster. The inclusion of these components provides guaranteed service levels and ensures resilient database performance and dependable application recovery. Organizationally, individual database servers are formed into clusters of independent interconnected nodes. Each node communicates with other nodes using the interconnection. Upon an unplanned failure of an active database server node, using clusterware, an application will fail over to another node and resume operations, without transaction loss, within a guaranteed time period. Likewise, upon a planned shutdown, an application will be gracefully switched over to another node in an orderly fashion.

The guarantee of service level thresholds is particularly crucial for commercial transaction-based database applications, such as used in the transportation, finance, and electronic commerce industries. System downtime translates to lost revenue and loss of market share. Any time spent recovering from a system failure is measurable in terms of lost transactions. Consequently, high availability systems budget a set time period to help minimize lost revenue due to unplanned outages. High availability systems also budget for planned service interruptions.

Table 1 describes the effects of service outages on a TCP/IP-based client. In the first case, an outage with sockets closed due to software failure or node shutdown, the client receives an error and recovers. In the second case, an outage with sockets left open, the client blocks and waits from 75 seconds to two hours.

TABLE 1

Client Effects.

| State of Sockets After Outage | Connection Request | Conversation (SQL or PL/SQL Request) | Blocked in I/O Read or Write |
|---|---|---|---|
| Socket Closed (software failure or node shutdown) | Client receives error | Client receives error | Client receives error |
| Socket left open (node panics) | Tcp_ip_abort_cinterval (75 seconds) | Tcp_ip_abort_interval (10 minutes) | Tcp_keepalive_interval (2 hours) |

In the prior art, highly availability database applications provide one example of a form of high availability application. Other forms of general high availability applications relate analogously. High availability database applications are typically implemented by building an infrastructure for each database instance executing on a single node. This type of implementation is termed single instance failover. Single instance failover solutions depend upon both fast failure detection and the full relocation of server or node resources within the allotted time recovery period. Upon detecting a database instance failure, the database instance is restarted on a spare node of the service cluster and all resources are moved to the new node to allow the spare node to complete the recovery. Database instance failure is detected through polling performed by monitors external to the database instance or via daemon processes operating as shell scripts in user memory space. Examples of prior art systems that implement single instance failover solutions include MC Service Guard, licensed by the Hewlett Packard Co., Palo Alto, Calif.; Sun Clusters, licensed by Sun Microsystems, Inc., Palo Alto, Calif.; HACMP, licensed by IBM, Armonk, N.Y.; and CAA, licensed by Compaq Computers, Austin, Tex.

The approach taken by these single instance failover solutions is inherently serial. A typical failover has a mean time to recover of about three to five minutes, an unsatisfactorily long period of time for most production databases. Time is lost in detecting, validating, and recovering from the failure. Moreover, an external monitor or daemon process can take 30 seconds or more to detect an application failure. Additional time is then lost in taking appropriate corrective action, including stopping the failed database instance, relocating the resources the failed database instance requires to a spare server, and restarting the database instance and high availability monitors on the new server. Even under the best circumstances, a failover and recovery can take several minutes.

Therefore, there is a need to improve time to recover in a high availability cluster database environment. Such an approach would provide higher system availability and faster application restart in the event of system failure or loss of database access. Such an approach should allow the recovery of failed nodes to proceed in parallel and off the critical path of application restart, while other processing resumes substantially uninterrupted on other surviving nodes.

There is a further need for an approach to structuring clustered database instances groups for high availability, where each include one or more dependent systems configured to take over in the case of a failover or switchover event from one or more of the other cluster members. Preferably, such an approach should also enable dynamic runtime load balancing.

SUMMARY OF THE INVENTION

The present invention provides a system and method for operating cluster frameworks that include resource groups cooperating together across a cluster, termed cooperative resource groups. There are three configurations of supported cooperative resource groups: (1) active/passive, where one node is active and the second node is passive; (2) all active, where every resource group is active; and (3) active/active/ . . . /passive, where the multiple nodes are active, except for nominalized standby or spare nodes. Within each cluster framework, database instances execute on a predefined preferred node. In the event of a node failover or shutdown, the services provided by the database instance are relocated to other nodes of the same cluster without moving resources. The failed cooperative resource group is placed on an off-line status on another node of the cluster with only an Internet Protocol (IP) address present. While off-line, all attempts to access the services formerly provided by the failed node result in an immediate Transmission Control Protocol (TCP)/IP error and the automatic selection of the next IP address in an address list of possible nodes of the cluster. Thus, applications can restart immediately on an alternate node without interruption in service and off the critical path for recovering the failed instance node.

An embodiment of the present invention is a system and method for providing cooperative resource groups for high availability applications, such as cluster databases. A cluster framework, including a plurality of nodes, is built. A plurality of cooperative resource groups is formed, each including a logical network address, at least one monitor and an application providing services and externally accessed using the logical network address. A plurality of resources is structured, each including a cluster service supporting the services provided by each application. A preferred node for execution is designated for each cooperative resource group and one or more possible nodes are provided as standby nodes for each other cooperative resource group. The services are restarted on a surviving node off a critical path of the preferred node upon an unavailability of the preferred node, while the logical network address is kept available on each possible node for the cooperative resource group.

A further embodiment is a system and method for cooperatively clustering high availability resource groups for clustered database applications. A node is designated as a preferred node within a cluster framework, which includes a plurality of cooperative resource groups. A cluster framework stack is started on the preferred node. An internet protocol address is acquired. An application is started. Application event monitors for the database instance are started. Notification is sent to each other such cooperative resource group within the cluster framework that the database instance is running and available for service. Cooperative resource group switching from the preferred node is enabled for the database instance.

Table 2 describes the effects of service outages on a TCP/IP-based client in an environment including cooperative resource groups and out-of-band service change notifications in accordance with the present invention. In the first case, an outage with sockets closed due to software failure or node shutdown, the client receives an error, plus an out-of-band event (service change notification) for a conversation or blocked I/O, and recovers. In the second case, an outage with sockets left open, the client receives either an error or an out-of-band event, thereby enabling the client to immediately recover. This arrangement eliminates TCP/IP timeout errors for active connections with active conversations.

TABLE 2

Client Effects.

| State of Sockets After Outage | Connection Request | Conversation (SQL or PL/SQL Request) | Blocked in I/O Read or Write |
|---|---|---|---|
| Socket Closed (software failure or node shutdown) | Client receives error | Client receives both error and out-of-band event | Client receives both error and out-of-band event |
| Socket left open (node panics) | Client receives error due to logical IP address failing over | Client receives out-of-band event | Client receives out-of-band event |

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 7 is a flow diagram showing a halt method for use in conjunction with the method of FIG. 5.

DETAILED DESCRIPTION

Figure 1:
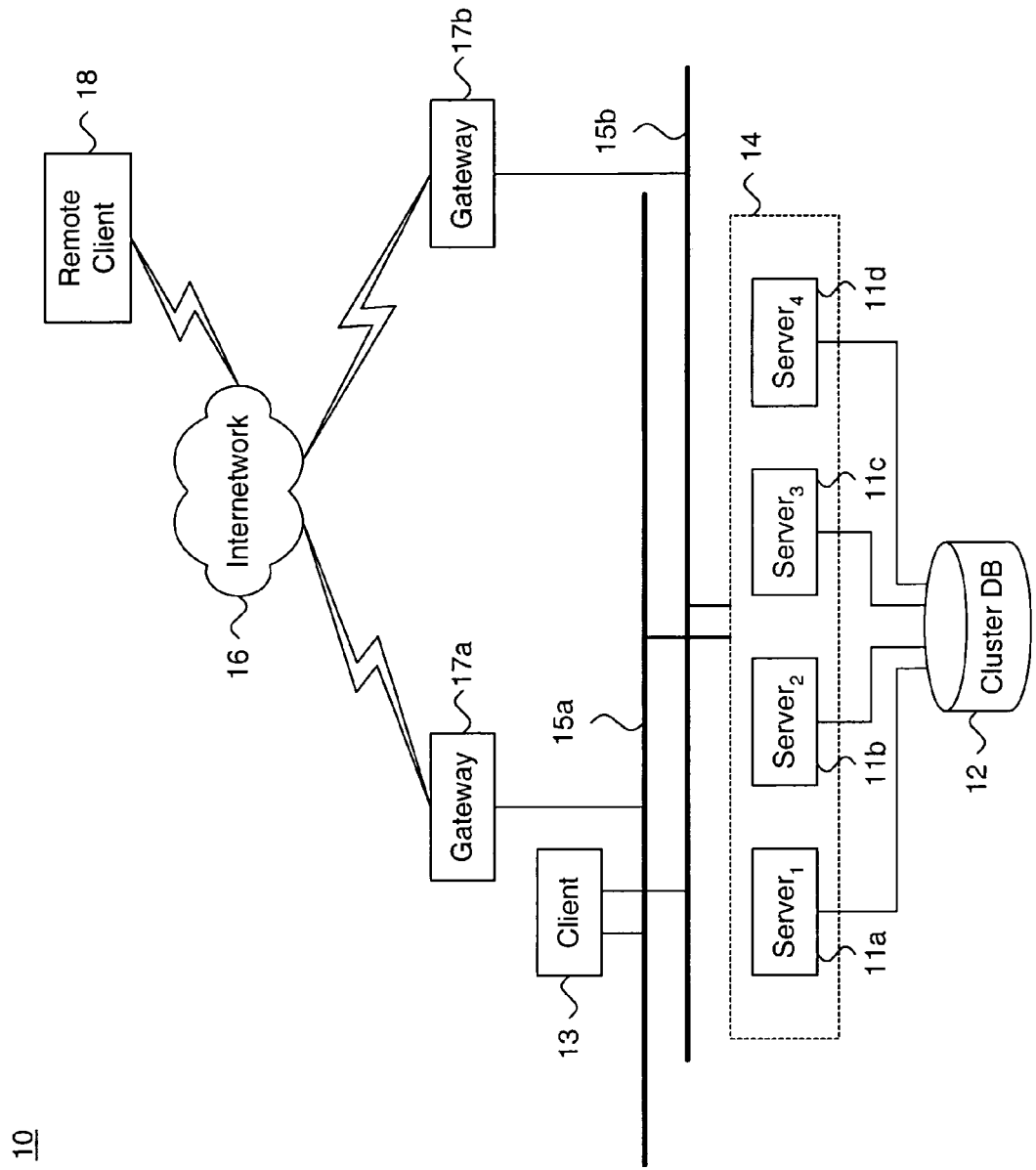
FIG. 1 is block diagram showing a cluster computing environment including cluster databases incorporating high availability components.

FIG. 1 is a block diagram showing a cluster database 12 incorporating high availability components. Parallel database servers 11a-d, each including a cooperative resource group are each coupled to a single cluster database 12 to form a high availability cluster framework 14, as further described below beginning with reference to FIG. 2. The servers 11 process a stream of transactions received from clients, such as client 13 and remote client 18, in parallel with each server processing an entire transaction.

Operationally, the remote client 18 is interconnected to the servers 11a-d via an internetwork 16, such as the Internet. Servers 11a-d and client 13 are interconnected via intranetworks 15a, 15b. Both intranetworks 15a and 15b are respectively interconnected to the internetwork 16 through gateways 17a-b. Other network topologies and configurations, including various combinations of intranetworks and internetworks are feasible, as would be recognized by one skilled in the art.

The cluster framework 14 appears as a single system to individual clients, which subscribe to the services published by each cluster. The client sessions receive notification of any changes in the services provided, such as described in U.S. Pat. No. 7,069,317, entitled "System And Method For Providing Out-Of-Band Notification Of Service Changes," filed Feb. 28, 2002, pending, the disclosure of which is incorporated by reference, and transfer to alternate nodes as necessary.

Within each cluster framework 14, each of the database servers 11 incorporate high availability components, such as described in J. Gray et al., "Transaction Processing: Concepts and Techniques," pp. 128-38, M. Kaufmann Pubs., San Francisco, Calif. 1993), the disclosure of which is incorporated by reference. Failover processing is initiated upon the detection of the termination or unscheduled stoppage ("hanging") of a database instance or system component, such as described in U.S. Pat. No. 7,058,629, entitled "System And Method For Detecting Termination Of An Application Instance Using Locks," filed Feb. 28, 2002, pending, the disclosure of which is incorporated by reference. Likewise, upon a planned shutdown, an application will switch over to another instance of the database supporting the service. Other situations in which failover processing is required are possible, as would be recognized by one skilled in the art.

The response times provided by the substitute database servers 12 in a standby node may be longer than prior to failover or switchover until the ramp-up period for populating the database instance caches has run, although the ramp-up period can be substantially minimized by pre-connecting to the standby node and warming the database instance caches beforehand, such as described in U.S. Pat. No. 6,892,205, entitled "System And Method For Pre-Compiling A Source Cursor Into A Target Library Cache," filed Feb. 28, 2002, pending, the disclosure of which is incorporated by reference.

The individual computer systems, including database servers 11, clients 13, and remote clients 18, are general purpose, programmed digital computing devices consisting of a central processing unit (CPU), random access memory (RAM), non-volatile secondary storage, such as a hard drive or CD-ROM drive, network interfaces, and peripheral devices, including user-interfacing means, such as a keyboard and display. Program code, including software programs, and data are loaded into the RAM for execution and processing by the CPU and results are generated for display, output, transmittal, or storage.

Figure 2:
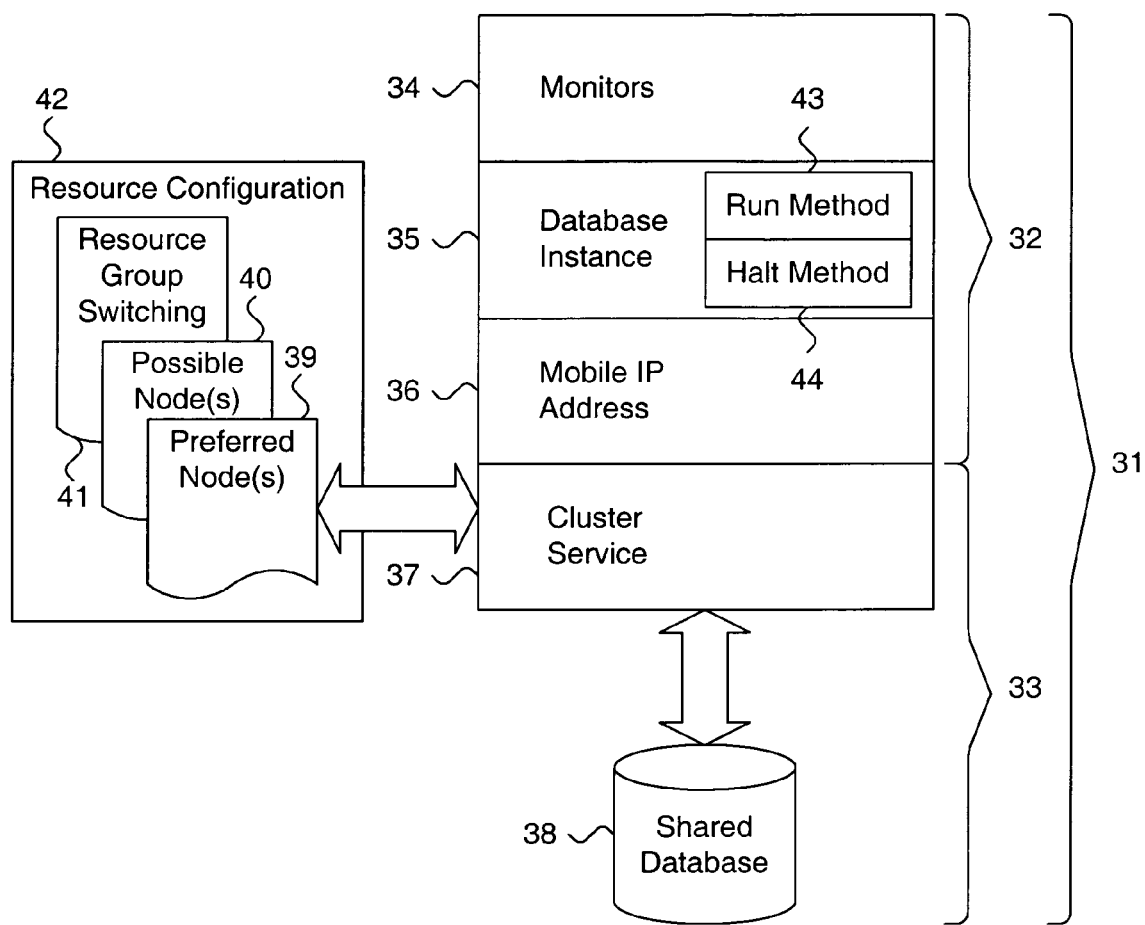
FIG. 2 is a functional block diagram showing a high availability database stack implemented on a server node, in accordance with the present invention.

FIG. 2 is a functional block diagram showing a high availability database stack 31 implemented on a server node 30, in accordance with the present invention. A database stack 31 supports a shared database 38 and is logically divided into two parts: a cooperative resource group 32, and a resource 33. The cooperative resource group 32 includes a mobile internet protocol (IP) address 36, a database instance 35 (or high availability application), and monitors external to the application 34. The mobile IP address 36 is assigned to the server node 30 to support client access. More generally, a generic high availability application could execute within the cooperative resource group 32, instead of the database instance 35, as would be recognized by one skilled in the art.

The monitors 34 detect the failure of the database instance 35, the loss of access to a resource 33, plus "hang" situations. The resource 33 includes a cluster service 37 and a shared database 38, as well as physical hardware devices, such as disk drives and network cards, and logical items, such as volume groups, TCP/IP addresses, applications, and database instances.

Within each cluster framework 14 (shown in FIG. 1), the cluster service 37 executes all operations on the cooperative resource group 32, including running and halting the cooperative resource group 32. A run method 43 brings the cooperative resource group 32 on-line and a halt method 44 stops and takes the cooperative resource group 32 off-line. The run method 43 and halt method 44 are further described below with reference to FIGS. 6 and 7, respectively.

The behavior of each cooperative resource group 32 is specified by settings stored in a resource configuration 42. These settings specify how a resource 33 behaves for planned and unplanned operations. The resource configuration 42 specifies a preferred node, one or more possible nodes, and whether resource group switching is enabled.

A cooperative resource group 32 runs on one or more pre-determined preferred nodes, as specified by the preferred node(s) setting 39, and is hosted on one or more possible nodes, as specified by the possible node(s) setting 40. On a multi-node cluster, all cooperative resource groups 32 specify a different preferred node. On the preferred nodes, each cooperative resource group 32 runs with all dependent resources 33 executing and available. On the possible nodes, each cooperative resource group 32 runs with only the mobile IP address 36 present and all other dependent resources off-line. The IP address 36 is always hosted and maintained in an up state, thereby eliminating TCP/IP timeouts for active connections with an active conversation following a node failure.

When a node failure occurs, the on-going operations of all systems using a database service running on the failed node are resumed and restored on an alternate node of the cluster. The service moves off the critical path for recovery and no resources need to be moved, as is the case for single instance application failover or switchover. The cooperative resource group 32 is simultaneously set to an off-line status on a possible node, provided that resource group switching is enabled, as specified by the resource group switching setting 41. While off-line, only the mobile IP address 36 of the failed node is enabled. All attempts to access services on the failed node result in a TCP/IP error and the next mobile IP address in the address list of possible nodes is selected. Since each cooperative resource group 32 operates independently, services are restored without impacting the on-going operation of the system. Importantly, no resources are stopped and restarted on the critical path for clients resuming work.

Each module within the database stack 31 is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The run method 43 and halt method 44 operate in accordance with a sequence of process steps, as further described below beginning with reference to FIGS. 6 and 7, respectively.

Figure 3:
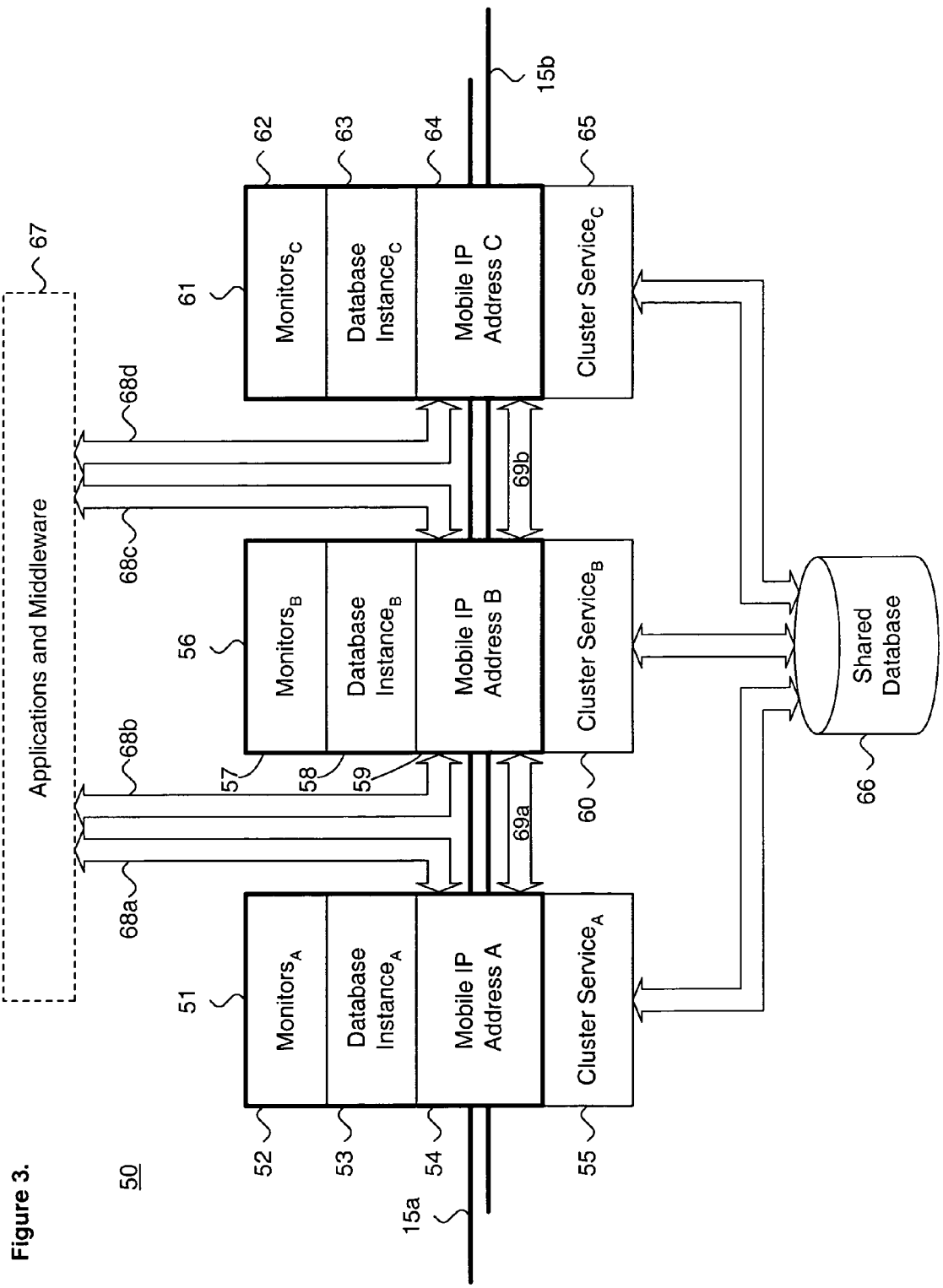
FIG. 3 is a functional block diagram showing, by way of example, cooperative resource groups during normal operation.

FIG. 3 is a functional block diagram showing, by way of example, cooperative resource groups during normal operation. By way of example, a three-node cluster framework 50 services a shared database 66. Each individual node includes a cooperative resource group 51, 56, 61 and cluster service 55, 60, 65, respectively. Each cooperative resource group 51, 56, 61 includes their respective monitors 52, 57, 62, database instances 53, 58, 63, and mobile IP addresses 54, 59, 64.

During normal operation, sessions executing in the applications and middleware layer 67 connect to the cooperative resource groups 51, 56, 61 using a transaction network service (TNS) connection alias 68a-d that maps to an address list containing the list of public IP addresses matching the mobile IP addresses 54, 59, 64 for the cooperative resource groups 51, 56, 61 within the network domain space defined by the intranetworks 15a, 15b. In addition, the individual database instances 53, 58, 63 communicate directly with each other over real application cluster memory channels 69a-b. The cooperative resource groups 51, 56, 61 run on their respective preferred nodes, as specified in the resource configuration 42 (shown in FIG. 2). While executing on a preferred node, the database instance 53, 58, 63 and all dependent resources are on-line and normal connection semantics apply.

Figure 4:
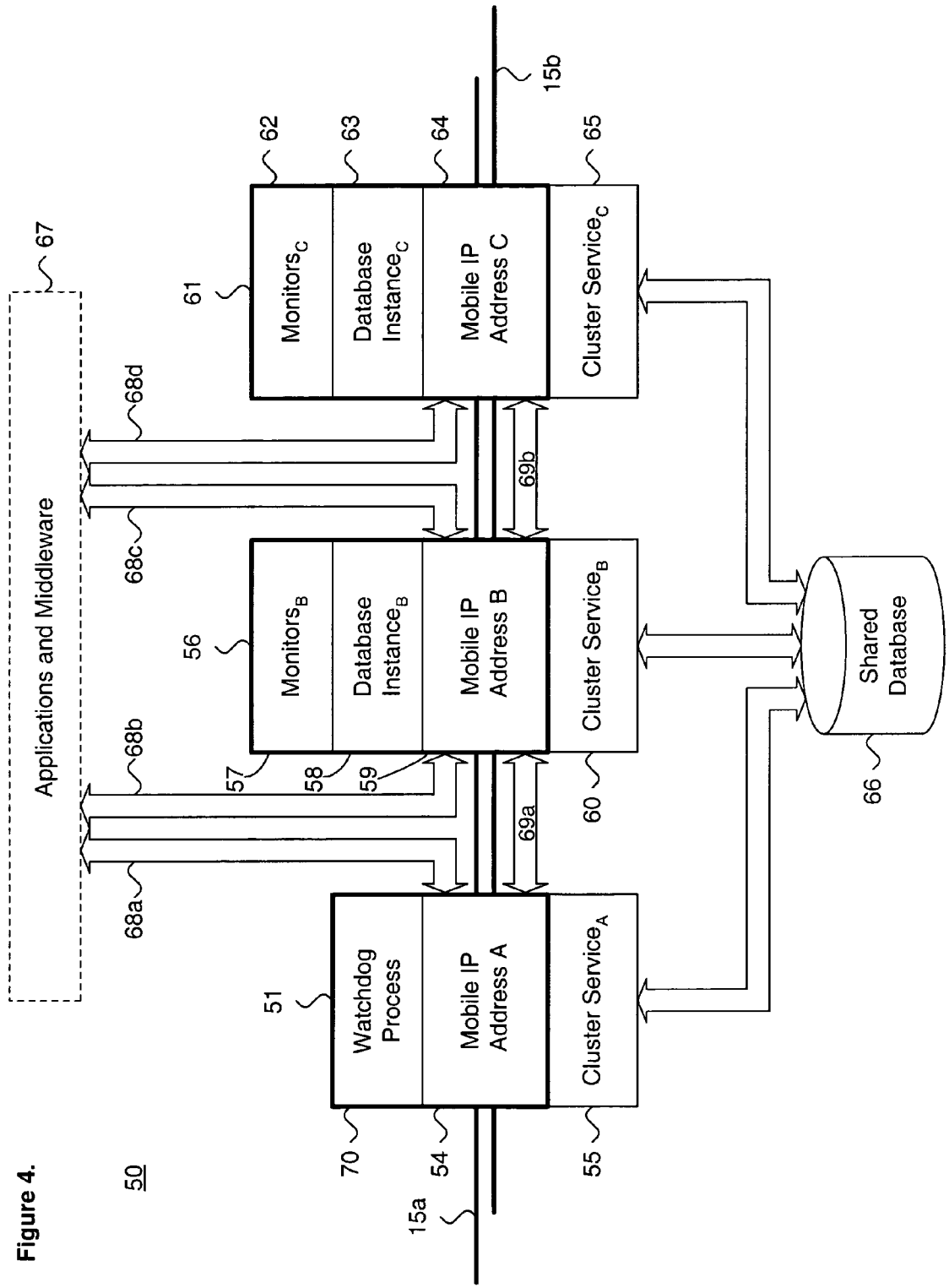
FIG. 4 is a functional block diagram showing, by way of example, the cooperative resource groups of FIG. 3 following a database instance failover.

FIG. 4 is a functional block diagram showing, by way of example, the cooperative resource groups of FIG. 3 following a database instance failover. The database instance 53 is no longer available due to either a planned shutdown. or system failure. Address list traversal in the network layer allows subscribing clients to immediately resume work at another cooperative resource group 52, 53 offering the services when the service change occurs. Accordingly, the services that the unavailable database instance supported are relocated and declared at one (or more) of the surviving cooperative resource groups 56, 61.

On the unavailable cooperative resource group 51, only the mobile IP address 54 is enabled. Attempting to access this mobile IP address 54 will result in a TCP/IP error and the immediate selection of the next mobile IP address in the address list of possible nodes. Simultaneously, the failed cooperative resource group 51 is shut down and restarted on a possible node in an off-line status with the only mobile IP address 54. Active client requests to the mobile IP address 54 will receive a TCP/IP error immediately, thereby eliminating periods of waiting for TCP timeouts.

The failover process keeps the mobile IP address 54 on-line on a preferred node in the event of a database instance failure. In event of node failure, the resource group switching setting 41 determines whether the cooperative resource group 51 is failed over by the cluster service 55 to the next system in the node list or is simply left shut down.

As further described below, beginning with reference to FIG. 5, resource group switching eliminates decision making during failover processing and prevents the failed cooperative resource group 51 from bouncing among the surviving nodes of the cluster when an error situation on the failed node prevents the database instance 53 from running. When the cooperative resource group 51 is started on a preferred node, resource group switching is enabled. Resource group switching is disabled when the cooperative resource group 51 starts on a possible node for a two-node cluster. If there are more than two nodes in the cluster, resource group switching is disabled only when the cooperative resource group 51 starts on the last node in the possible node list.

A watchdog process 70 is spawned on the preferred node whenever a cooperative resource group 51 is halted. The watchdog process 70 ensures that the database instance 53 and the mobile IP address 54 are restarted, typically when other systems or cooperative resource groups 56, 61 are unavailable due to, for example, planned maintenance.

To restore processing, a recovered cooperative resource group 51 is brought back on-line by the cluster service 55. Process restoration can occur either due to explicit planned use operations, or automatically if the cooperative resource group 51 is configured to fall back. The restore processing brings the database instance 53 back on-line on the preferred node. Since the cooperative resource groups 51, 56, 61 are independent, client sessions do not use the mobile IP address 54 at a recovered cooperative resource group 51 while that cooperative resource group is off-line, and subsequently restoring processing causes no interruption to on-going processing by the existing client sessions.

Figure 5:
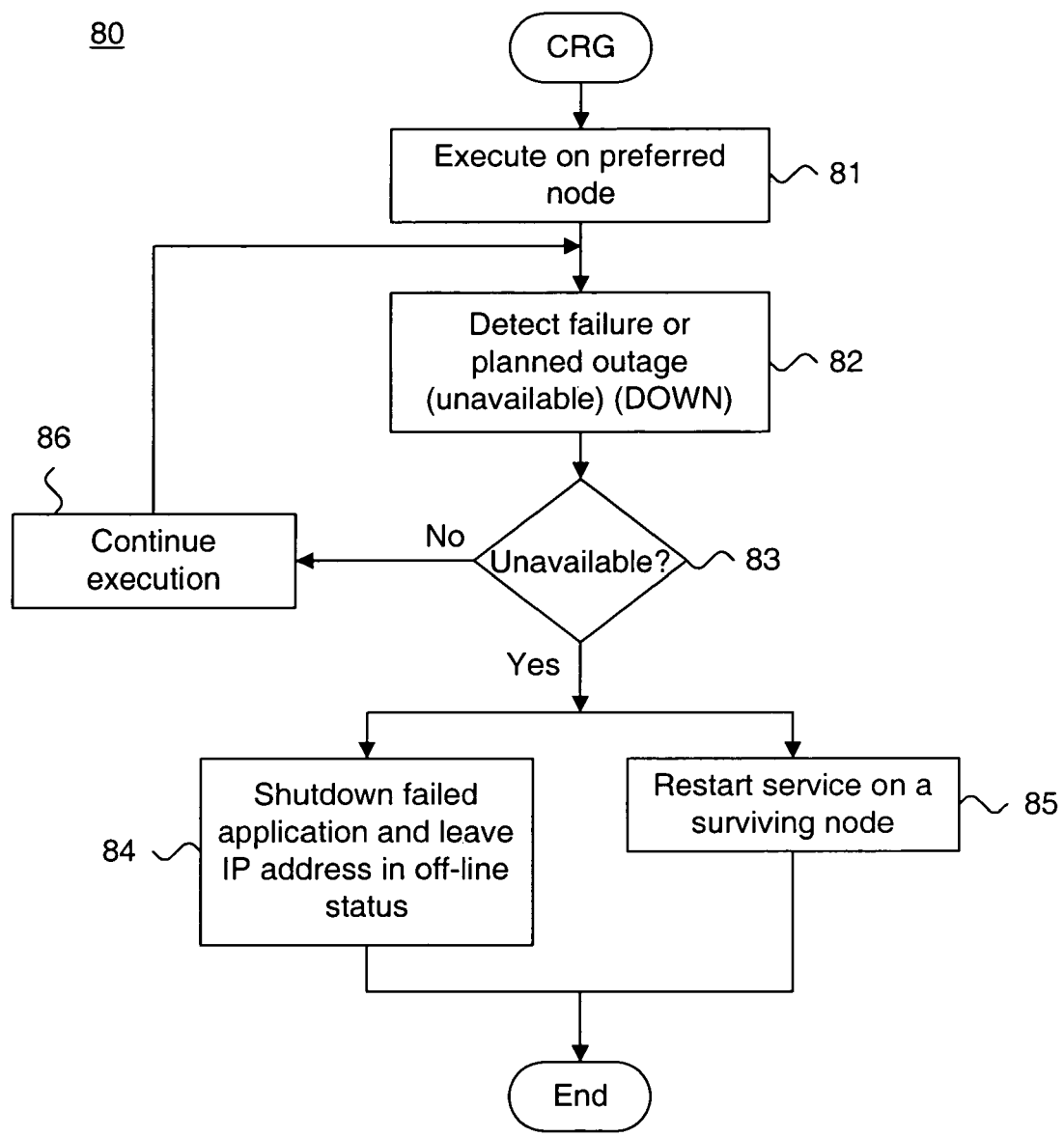
FIG. 5 is a flow diagram showing a method for providing cooperative resource groups for high availability applications, in accordance with the present invention.

FIG. 5 is a flow diagram showing a method for providing cooperative resource groups for high availability applications 80, in accordance with the present invention. The operations performed on a preferred node are as follows.

Each cooperative resource group 32 executes on a preferred node (block 81). Failures or planned outages are detected (block 82), such as described in related U.S. Pat. No. 7,058,629, "System And Method For Detecting Termination Of An Application Instance Using Locks," filed Feb. 28, 2002, pending, the disclosure of which is incorporated by reference. Execution continues (block 86), while the node remains available (block 83). Otherwise, if the node is unavailable due to a failure or outage (block 83), the failed or down node is shutdown with the IP address set in an off-line status (block 84). In parallel, the service is restarted on a surviving node (block 85), off the critical path of the shut-down node. The routine then ends.

Figure 6:
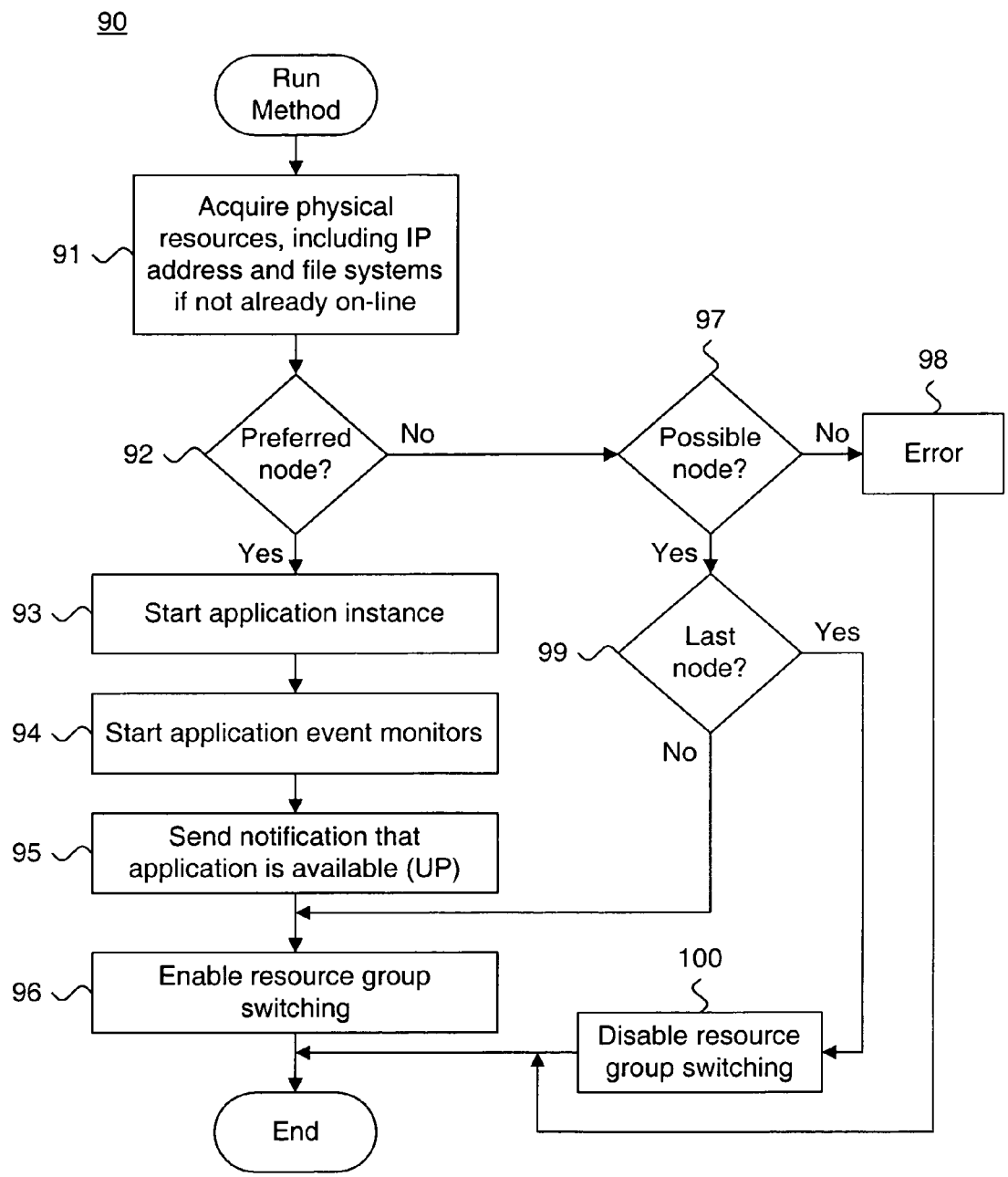
FIG. 6 is a flow diagram showing a run method for use in conjunction with the method of FIG. 5.

FIG. 6 is a flow diagram showing a run method 90 for use in conjunction with the method of FIG. 5. The purpose of this method is to start an application under the protection of a cooperative resource group.

First, the physical resources are acquired, including obtaining the mobile IP address 36 and any file systems required if not already on-line (block 91). If the cooperative resource group 32 is being brought on-line on a preferred node (block 92), the database instance 35 (shown in FIG. 2) is started (block 93). External monitors 35 are started (block 94). Notification that the database instance 35 is available (UP) is sent (block 95). Finally, the resource group switching setting is enabled (block 96).

If the cooperative resource group 32 is executing on a possible node (block 97), and the possible node is the last node in the possible node list (block 99), the resource group switching setting is disabled (block 100). Otherwise, if the possible node is not the last possible node in the possible node list (block 99), the resource group switching setting is enabled (block 96). If the cooperative resource group 32 is being brought up on neither a preferred node (block 92) nor a possible node (block 97), an error condition exists (block 98). The run method then completes.

FIG. 7 is a flow diagram showing a halt method 110 for use in conjunction with the method of FIG. 5. The purpose of this routine is to halt the cooperative resource group 32.

First, if the cooperative resource group 32 is executing on a preferred node (block 111), the application event monitors are stopped (block 112). The database instance 35 is halted (block 113). Notification that the database instance 35 is unavailable (DOWN) is sent (block 114). The watchdog process 82 (shown in FIG. 4) is started. Finally, physical resources, including the mobile IP address 36 and any file systems, are released (block 116).

Otherwise, if the cooperative resource group is not on a preferred node (block 111) and is on a possible node (block 117), only the physical resources, including the mobile IP address 36 and any file systems, are released (block 118). However, if the possible node is the last node in the possible node list (block 119), an alert is sent (block 121), as no further possible nodes are available. Otherwise, if the possible node is not the last node in the possible node list (block 119), a watchdog process 82 (shown in FIG. 4) is started (block 120). If the cooperative resource group 32 is neither running on a preferred node (block 111), nor a possible node (block 117), an error condition exists (block 120). The method then completes.

While the invention has been particularly shown and described as referenced to the embodiments thereof, those skilled in the art will understand that the foregoing and other changes in form and detail may be made therein without departing from the spirit and scope of the invention.

What is claimed is:

1. A machine-implemented method, comprising the steps of:
   receiving one or more requests from a service requester that is using a network address to address the one or more requests to a service provided by a first node within a cluster, wherein said first node is configured to provide said service to requests addressed to said network address;
   in response to said first node becoming unavailable, automatically configuring a second node of the cluster to respond to requests addressed to said network address;
   after said first node becomes unavailable, receiving a request from the service requester that is using said network address to address a message to said cluster related to said service; and
   in response to said message, said second node of the cluster sending a response that indicates an error condition.

2. The method of claim 1, further comprising the steps of:
   upon receiving said response, the service requester identifying a second network address to access said service; and
   the service requester using said second network address to address a second message to said cluster related to said service.

3. The method of claim 1, further comprising the step of:
   storing, at the first node, information identifying one or more nodes of the cluster as being standby nodes, wherein each of the one or more standby nodes is configured to provide the service in response to being instructed to provide the service if the first node becomes unavailable.

4. The method of claim 1, further comprising the step of:
   in response to said first node becoming unavailable, determining if said first node is configured to allow the service to be provided by another node of the cluster.

5. The method of claim 4, further comprising the step of:
   in response to determining said first node is configured to allow the service to be provided by another node of the cluster, determining a standby node of the cluster to perform the service; and
   instructing the standby node to perform the service.

6. The method of claim 1, further comprising the steps of:
   in response to said first node becoming unavailable, instructing a standby node of the cluster to perform the service;
   determining whether another node of the cluster is capable of providing the plurality of services provided by the standby node; and
   if another node of the cluster is not capable of providing the plurality of services provided by the standby node, then configuring the standby node to disallow the plurality of services to be provided by another node of the cluster.

7. The method of claim 6, further comprising the step of:
   in response to configuring the standby node to disallow the plurality of services to be provided by another node of the cluster, issuing an alert to a user.

8. The method of claim 1, wherein said first node comprises a monitor process, and wherein said monitor process is configured to detect if said first node becoming unavailable.

9. A computer-readable storage medium carrying one or more sequences of instructions, wherein execution of the one or more sequences of instructions by one or more processors causes the one or more processors to perform the steps of:
   receiving one or more requests from a service requestor that is using a network address to address the one or more requests to a service provided by a first node within a cluster, wherein said first node is configured to provide said service to requests addressed to said network address;
   in response to said first node becoming unavailable, automatically configuring a second node of the cluster to respond to requests addressed to said network address;
   after said first node becomes unavailable, receiving a request from the service requestor that is using said network address to address a message to said cluster related to said service; and
   in response to said message, said second node of the cluster sending a response that indicates an error condition.

10. The computer-readable storage medium of claim 9, wherein execution of the one or more sequences of instructions by the one or more processors causes the one or more processors to perform the steps of:
    upon receiving said response, the service requester identifying a second network address to access said service; and
    the service requester using said second network address to address a second message to said cluster related to said service.

11. The computer-readable storage medium of claim 9, wherein execution of the one or more sequences of instructions by the one or more processors causes the one or more processors to perform the step of:
    storing, at the first node, information identifying one or more nodes of the cluster as being standby nodes, wherein each of the one or more standby nodes is configured to provide the service in response to being instructed to provide the service if the first node becomes unavailable.

12. The computer-readable storage medium of claim 9, wherein execution of the one or more sequences of instructions by the one or more processors causes the one or more processors to perform the step of:

in response to said first node becoming unavailable, determining if said first node is configured to allow the service to be provided by another node of the cluster.

13. The computer-readable storage medium of claim 12, wherein execution of the one or more sequences of instructions by the one or more processors causes the one or more processors to perform the step of:

in response to determining said first node is configured to allow the service to be provided by another node of the cluster, determining a standby node of the cluster to perform the service; and instructing the standby node to perform the service.

14. The computer-readable storage medium of claim 9, wherein execution of the one or more sequences of instructions by the one or more processors causes the one or more processors to perform the steps of:

in response to said first node becoming unavailable, instructing a standby node of the cluster to perform the service;

determining whether another node of the cluster is capable of providing the plurality of services provided by the standby node; and if another node of the cluster is not capable of providing the plurality of services provided by the standby node, then configuring the standby node to disallow the plurality of services to be provided by another node of the cluster.

15. The computer-readable storage medium of claim 14, wherein execution of the one or more sequences of instructions by the one or more processors causes the one or more processors to perform the step of:

in response to configuring the standby node to disallow the plurality of services to be provided by another node of the cluster, issuing an alert to a user.

16. The computer-readable storage medium of claim 9, wherein said first node comprises a monitor process, and wherein said monitor process is configured to detect if said first node becoming unavailable.

* * * * *

UNITED STATES PATENT AND TRADEMARK OFFICE
CERTIFICATE OF CORRECTION

PATENT NO. : 7,444,335 B1
APPLICATION NO. : 10/086782
DATED : October 28, 2008
INVENTOR(S) : Colrain et al.

Page 1 of 1

It is certified that error appears in the above-identified patent and that said Letters Patent is hereby corrected as shown below:

On the Title page, in field (74), in "Attorney, Agent, or Firm", in column 2, line 1, delete "Troung" and insert -- Truong --, therefor.

Title page 2, under "Other Publications", in column 2, line 3, delete "Rdition" and insert -- Edition --, therefor.

In column 7, line 42, after "shutdown" delete ".".

In column 10, line 29, in Claim 9, delete "requestor" and insert -- requester --, therefor.

In column 10, line 39, in Claim 9, delete "requestor" and insert -- requester --, therefor.

Signed and Sealed this

Fourth Day of May, 2010

David J. Kappos
*Director of the United States Patent and Trademark Office*